United States Patent Office 2,843,874
Patented July 22, 1958

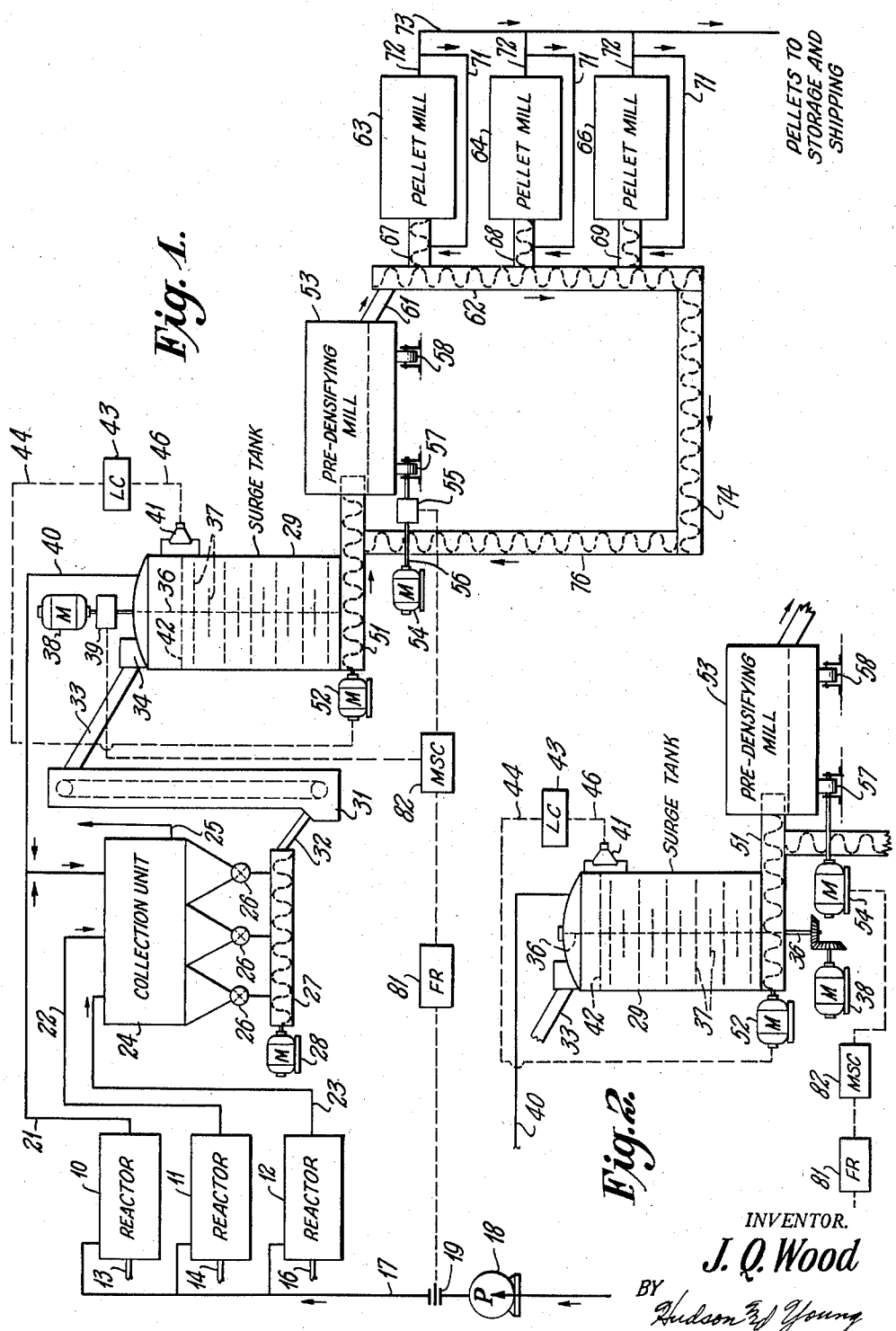

2,843,874

PROCESS AND APPARATUS FOR DENSIFYING AND PELLETING CARBON BLACK

James Q. Wood, Bartlesville, Okla., assignor to Phillips Petroleum Company, a corporation of Delaware Application July 26, 1954, Serial No. 445,621

18 Claims. (Cl. 18—1)

This invention relates to a process and apparatus for densifying and pelleting carbon black.

Carbon black in loose flocculent form as produced in carbon black furnaces or reactors is conventionally pelleted into small relatively dense pellets to facilitate handling and various usages. As it comes from the furnaces the loose black is of extremely low density, usually in the range of about 2 to 5 pounds per cubic foot. This black of low density is fed to pelleting mills conventionally by screw conveyors leading from a common conveyor. Because of the difficulty in feeding a constant weight of the black per unit of time to any given pellet mill and because of the variation in density of the black caused by variations in the production rate of the black, the product pellets vary considerably in density and quality. In other words, a small increase in the loose black density results in a sizeable percentage increase in the feed rate to a pellet mill. Hence, the problem of accurately measuring the loose black feed rate to the mills plays a major part in producing pellets of varying quality and density.

An object of the present invention is to provide a process and apparatus for densifying loose carbon black to a constant density. Another object of the invention is to provide an improved process and apparatus for pelleting carbon black. It is also an object of the invention to provide a process and apparatus which improve the uniformity and quality of carbon black pellets. A further object is to provide a method and apparatus for accurately controlling the density of the carbon black feed to a pellet mill. Other objects of the invention will become apparent from a consideration of the accompanying disclosure.

In accordance with the invention, loose carbon black from a series of furnaces or reactors is partially degassed and densified in a degassing zone by mechanical agitation of the carbon black, thereby effecting a densifying action and densification of the carbon black. The partially degassed and densified carbon black is then passed to a pre-densifying mill which completes the densification of the carbon black preparatory to passing the densified black to a series of pellet mills. In this manner it is possible to densify loose carbon black to a predetermined constant density of at least 9, and, preferably, to a density in the range of 12 to 14 pounds per cubic foot.

It has been found that pre-densification of the carbon black in the manner of the invention to a constant density makes it feasible to maintain a uniform and constant feed rate of the pre-densified black to the pellet mills and thereby obtain better mill operation and better, more uniform quality pellets.

A more complete understanding of the information may be had from a consideration of the drawing of which Figures 1 and 2 are schematic plan views of as many arrangements of apparatus of the invention.

Referring to Figure 1, a series of reactors or furnaces 10, 11, and 12 feed a suitable carbonaceous fuel thru lines 13, 14, and 16 and oxygen-containing gas such as air thru a common feed line 17. A blower 18 and a flow return indicator 19 are positioned in air line 17. Effluent lines 21, 22, and 23 deliver loose black produced in the furnaces to a collection system 24. A stack 25 on collection unit 24 carries off-gas from the unit. Black is fed from this collection system by means of star valves or other feeding devices 26 to conveyor 27 which is operated by motor 28. Conveyor 27 is of extra large capacity to accommodate variations in the black production rate. Conveyor 27 feeds black to a degassing or surge tank 29 by any suitable means, such as an elevator or conveyor 31 which is connected to conveyor 27 by a conduit or chute 32 and by another conduit or chute 33 to surge tank 29. A micro-pulverizer 34 is connected between conduit 33 and surge tank 29.

Surge tank 29 contains a suitable agitator, preferably one containing an axial shaft 36 to which are attached a series of arms of varying lengths, alternately spaced. Shaft 36 is connected with a motor 38, having a speed reducer 39. This arrangement may be replaced by its equivalent, a variable speed motor, as desired. A gas vent line 40 connects the top of surge tank 29 with collection unit 24.

A level sensing device 41 is attached to the upper section of surge tank 29 and is designed to maintain a predetermined level of carbon black within the surge tank, such as at line 42, thru level controller 43 which is in actuating communication with variable speed motor 52 thru line 44, and which in turn is responsive to level sensing device 41 thru line 46.

A conveyor 51 operated by a motor 52 is positioned at the bottom of surge tank 29 so as to receive partially degassed and densified black from the surge tank and deliver the black to a pre-densifying mill 53. Mill 53 is a horizontally disposed rotary cylindrical tumbling mill which is operated by a motor 54 thru speed reducer 55 and shaft 56. Shaft 56 is connected with a supporting wheel 57 which may also be a pinion gear which operates on a girth gear on mill 53 (not shown). Other supporting wheels 58 on both sides of the vertical plane thru the axis of the mill provide the required support for the mill. Pre-densification mill 53 operates with a constant bed level which is determined by the position of the outlet or outlets in the delivery end of the mill. A chute 61 delivers pre-densified black to a common conveyor 62 which passes the ends of pellet mills 63, 64, and 66, and individual conveyors 67, 68, and 69, having individually controlled variable speed drives (not shown), feed carbon black at a controlled rate from common conveyor 62 into each of the mills. Each mill in the series has a recycle line 71 for recycling pellets from effluent line 72 to the feed end of the mill. A common pellet product line 73 in the form of the conveyor picks up pelleted products from each of the mills and delivers the same to storage or to shipping. Recycle conveyors 74 and 76 return pre-densified carbon black, which has not been fed into the mills, back to the feed end of pre-densifying mill 53 via conveyor 51.

In the embodiment of the invention shown in Figure 1, rate-of-flow-recording instrument 81 is connected with rate-of-flow-sensing instrument 19 so as to be responsive thereto and is in actuating communication with motor-speed controller 82 which is in turn in actuating communication with speed controllers 39 and 55 on motors 38 and 54, respectively. Motor-speed controller 82 is designed so as to permit regulation of the output-shaft speed of motors 38 and 54 in response to variations in the flow of oxygen-containing gas to the furnaces as measured by flow thru line 17.

Operation in accordance with the embodiment of the invention shown in Figure 1 involves feeding a partially degassed black of essentially constant predetermined density to pre-densifying mill 53. The speed of conveyor 51 is adjusted through level controller 43 which is in actuating communication with variable-speed motor 52, thereby maintaining a constant level of black in surge tank 29. As the rate in conveyor 51 increases due to changes in the black production rate, the effective output speed of motor 38 is also increased via speed reducer 39, upon receiving communication from motor speed controller 82, in order to maintain approximately the same density of black in conveyor 51. Conversely, a decrease in black production rate will require a decrease in the output speed of motor 38. When the black production rate is low, the density of the black in the collection system is lower than at high black production rate, thereby requiring more milling in order to reach the preferred density of 12 to 14 pounds per cubic foot. The required extra milling is obtained by increasing the rotational speed of the densifying mill. In order to obtain the additional milling required the motor speed controller increases the speed of mill 53 by properly actuating variable-speed motor 54 or speed reducer 55. Another method of operating the controllers in the embodiment shown in Figure 1 is to maintain the speed of mill 53 constant and to vary the speed of agitator 36 in surge tank 29 by properly actuating variable-speed motor 38 or speed reducer 39 so as to produce a degassed black of desirable density which is further densified to the preferred density in mill 53, operated at constant speed.

Referring to Figure 2, the various apparatus elements shown are correspondingly numbered to those shown in Figure 1, the principal difference being in the control arrangement shown. Operation in accordance with the embodiment shown in this figure comprises operating agitator shaft 36 in surge tank 29 at a constant speed and varying the rate of feed of partially densified and degassed black from the surge tank to pre-densification mill 53 and also varying the speed of the mill in response to changes in the rate of air flow in line 17.

In each embodiment the carbon black effluent from the pre-densifying mill is maintained at a density of at least 9 pounds, and preferably, in the range of 12 to 14 pounds per cubic foot and the individual mill feed conveyors charge a constant volume of the constant density pre-densified black to the pellet mills and thereby charge a relatively constant weight of the black per unit time within the required range to obtain uniform pellet quality in the effluent pellets from the pelleting mills. The density of the black from mill 53 varies up to about 1 pound per cubic foot which is a small percent of the 12 to 14 pound black as compared with a variation in black density of 3 to 3.5 pounds on 2 to 5 or 6 pound black.

It is feasible to produce sufficient densified black of uniform density in surge tank 29 to feed the same directly to the pellet mills and obtain improved operation thereof and improved pellet quality. It is also feasible to pass loose black directly from the collection unit to the pre-densifying mill and regulate the mill speed so as to produce a pre-densified black of sufficient uniform density to improve the operation of the pellet mills and the quality of the product pellets. In other words, either the agitated surge tank or the pre-densifying mill may be utilized to pre-densify the loose black to a uniform density and thereby improve the pelleting process, but it is preferred to use both the agitated surge tank and the pre-densifying mill in producing a black of constant uniform density because of the greater ease of maintaining uniform density of the predensified black with this combination of equipment and predensifying steps.

Utilization of the rate of flow of oxygen-containing gas, such as air, thru the common feed line 17 to the reactors as the variable for controlling the densification of the carbon black is the simplest manner of control, although other functions of the carbon black producing process may be utilized for this purpose. Any factor which is indicative of the rate of flow of the carbon black effluent from the reactors may be utilized to control the densification of the carbon black prior to feeding the same to the pellet mills.

Certain modifications of the invention will become apparent to those skilled in the art and the illustrative details disclosed are not to be construed as imposing unnecessary limitations on the invention.

I claim:

1. Apparatus for pelleting carbon black comprising in combination at least one pellet mill each having a feed inlet line for black, a product outlet line for pellets, and a pellet recycle line from the outlet to the inlet of said mill; a horizontal, rotatable, cylindrical, pre-densifying mill having a feed inlet line and an effluent line; conveyor means connecting said effluent line with the feed inlet line to each said pellet mill; at least one carbon black furnace having an effluent line connected with the feed inlet line of said pre-densifying mill; and means for controlling the rate of rotation of said pre-densifying mill in response to the rate of carbon black production.

2. The apparatus of claim 1 including a degassing surge tank having agitating means therein for degassing flocculent carbon black, said surge tank having an outlet for black in its lower section connected with the inlet to said pre-densifying mill by conveyor means and an inlet in its upper section for receiving carbon black from said carbon black furnace.

3. The apparatus of claim 2 wherein said tank is an upright cylinder and said agitating means comprises a motor-driven vertical shaft having radially extending arms spaced along its length.

4. Apparatus for pelleting carbon black comprising in combination a series of pellet mills; a pre-densifying mill connected by conveyor means with the feed inlet of each pellet mill; a series of carbon black furnaces or reactors having a common oxygen-containing-gas supply line; means for feeding carbon black from said furnaces to said pre-densifying mill; and means for regulating the rate of densifying in said pre-densifying mill in response to the rate of flow of gas in said supply line.

5. The apparatus of claim 4 wherein said last-named means comprises a variable-speed motor on said pre-densifying mill; a flow rate recorder in said supply line; and a motor-speed controller responsive to said flow rate recorder and in actuating communication with said motor.

6. Apparatus for pelleting carbon black comprising in combination a series of pellet mills; a pre-densifying mill connected by conveyor means with the feed inlet of each pellet mill; a series of carbon black furnaces having a common oxygen-containing-gas supply line; a surge tank having a rotatable agitator for degassing black fed thereto; means for passing carbon black from said furnaces to said surge tank; conveyor means for passing degassed black from said surge tank to said pre-densifying mill; and means for regulating the rate of degassing in said surge tank by varying the rate of rotation of said agitator in response to the rate of flow of gas in said supply line.

7. The apparatus of claim 6 wherein said last-named means comprises a variable-speed motor on said rotatable agitator; a flow rate recorder in said supply line; and a motor-speed controller responsive to said flow rate recorder and actuatably connected with said motor.

8. Apparatus for pelleting carbon black comprising in combination a series of pellet mills; a horizontal, rotatable, cylindrical, pre-densifying mill connected by conveyor means with the feed inlet of each pellet mill; a series of carbon black furnaces having a common oxygen-containing-gas supply line; a surge tank having a rotatable agitator for degassing black fed thereto; means for passing carbon black from said furnaces to said surge tank; conveyor means for passing degassed black from said surge tank to said pre-densifying mill; means for regulating the rate of pre-densifying in said pre-densifying mill in response to rate of flow of gas in said supply line; and means for regulating the rate of degassing said black in said surge tank in response to rate of flow of gas in said supply line.

9. The apparatus of claim 8 wherein the last two said means comprise a flow rate recorder in said supply line; a motor-speed controller responsive to said flow rate recorder and actuatably connected with a variable-speed motor on said rotatable agitator and with a variable-speed motor on said pre-densifying mill.

10. Apparatus for pelleting carbon black comprising in combination a series of pellet mills; a pre-densifying mill connected by conveyor means with the feed inlet of each pellet mill; a series of carbon black furnaces; a carbon black collection bin connected with the effluent line from each of said furnaces; an agitator-type surge tank having an inlet in its top section connected with a conveyor leading from said collection bin and an outlet in its bottom section connected with said pre-densifying mill by a conveyor; a variable-speed motor on said last-named conveyor; a level controller responsive to the carbon black level in an upper section of said surge tank, said level controller being in actuating communication with said variable-speed motor and adapted to maintain a substantially constant bed level in said surge tank.

11. The apparatus of claim 10 including a common fluid feed line to said furnaces; a variable-speed motor on said pre-densifying mill; a flow rate recorder in said common feed line; and a motor-speed controller responsive to said flow rate recorder and actuatably connected with said last-named variable-speed motor.

12. The apparatus of claim 11 including a variable-speed motor on the agitator of said surge tank responsive to said motor-speed controller.

13. Apparatus for densifying carbon black which comprises in combination an upright cylindrical surge tank having rotatable agitator means for degassing carbon black; a carbon black feed line in an upper section, and an outlet in the bottom for partially densified black; a pre-densifying rotatable horizontal cylindrical mill having a feed inlet connected to the outlet of said surge tank by a conveyor and a level sensing means sensitive to the level of carbon black in the upper section of said surge tank in operative control of said conveyor.

14. A process for pelleting loose carbon black which comprises passing loose black from a carbon black furnace to a degassing zone; agitating said black in said zone so as to partially degas and densify same; passing resulting black to an unobstructed rotary tumbling zone and there tumbling said black under conditions such as to produce a black of substantially uniform density substantially greater than that of the feed to said rotary tumbling zone; regulating the passing of black from said degassing zone to said tumbling zone so as to maintain a constant level of black in said degassing zone; and thereafter pelleting the resulting densified black.

15. A process for densifying loose carbon black comprising agitating loose black in a constant level bed so as to at least partially degas and densify said black; feeding the resulting black to a tumbling zone at a controlled rate to maintain said constant level; tumbling the black in said tumbling zone at a controlled rate such that a black of substantially constant density is produced; and pelleting the resulting black in a pelleting mill.

16. Apparatus for pelleting carbon black comprising in combination a series of pellet mills; a pre-densifying mill connected by conveyor means with the feed inlet of each pellet mill; a series of carbon black furnaces or reactors having a common oxygen-containing-gas supply line; a carbon black collection bin connected with the effluent line from each of said furnaces; an agitator-type surge tank having an inlet in its top section connected with a conveyor leading from said collection bin and an outlet in its bottom section connected with said pre-densifying mill by a conveyor; a variable-speed motor on said last-named conveyor; a level controller responsive to the carbon black level in an upper section of said surge tank, said level controller being in actuating communication with said variable-speed motor and adapted to maintain a substantially constant bed level in said surge tank; a flow rate recorder in said supply line; and a motor-speed controller responsive to said flow rate recorder and actuatably connected with a variable-speed motor on a rotatable agitator in said agitator-type surge tank.

17. A process for manufacturing carbon black pellets which comprises producing carbon black in a combustion zone by partial oxidation of a carbonaceous fuel; feeding the resulting black to a degassing zone and agitating and degassing the black therein at a rate regulated in response to the rate of production of carbon black in said combustion zone as measured by the flow rate of oxidant thereto; passing the degassed black to a first rotary tumbling zone and tumbling the black therein to a substantially constant density substantially greater than that of the black entering said tumbling zone; and pelleting the resulting densified black in a second rotary tumbling zone.

18. A process for manufacturing carbon black pellets which comprises producing carbon black in a combustion zone by partial oxidation of a carbonaceous fuel; feeding the resulting black to a degassing zone and agitating the black therein so as to partially degas the same; passing the resulting degassed black to a first rotary tumbling zone and tumbling said black therein at a regulated rate in response to the rate of production of carbon black in said combustion zone as measured by the flow rate of oxidant thereto to produce black of substantially constant density greater than that of the black entering said tumbling zone; and pelleting the resulting densified black in a second rotary tumbling zone.

References Cited in the file of this patent

UNITED STATES PATENTS

| | | |
|---|---|---|
| 2,120,540 | Billings et al. | June 14, 1938 |
| 2,121,633 | Hartman et al. | June 21, 1938 |
| 2,131,686 | Heller et al. | Sept. 27, 1938 |
| 2,164,164 | Price | June 27, 1939 |
| 2,457,962 | Whaley | Jan. 4, 1949 |
| 2,502,106 | Skoog et al. | Mar. 28, 1950 |
| 2,511,088 | Whaley | June 13, 1950 |
| 2,550,802 | Gholson | May 1, 1951 |
| 2,695,837 | Benz | Nov. 30, 1954 |

FOREIGN PATENTS

| | | |
|---|---|---|
| 578,658 | Great Britain | July 8, 1946 |

UNITED STATES PATENT OFFICE
CERTIFICATE OF CORRECTION

Patent No. 2,843,874                                        July 22, 1958

James Q. Wood

It is hereby certified that error appears in the printed specification of the above numbered patent requiring correction and that the said Letters Patent should read as corrected below.

Column 6, line 48, after "tumbling zone." insert the following as claim 19:

19. A process for manufacturing carbon black pellets which comprises producing carbon black in a combustion zone by partial oxidation of a carbonaceous fuel; feeding the resulting black to a degassing zone and agitating the black therein so as to partially degas said black; passing the degassed black to a rotary tumbling zone at a controlled rate so as to maintain a constant level of black in said degassing zone; tumbling said black in said tumbling zone to a substantially constant density substantially greater than that of the black entering said tumbling zone; and pelleting the resulting densified black in a second tumbling zone.

in the heading to the printed specification, line 7, for "18 Claims." read -- 19 Claims. --.

Signed and sealed this 31st day of March 1959.

(SEAL)
Attest:

KARL H. AXLINE                                      ROBERT C. WATSON
Attesting Officer                                Commissioner of Patents